(12) United States Patent
Siedel

(10) Patent No.: US 6,596,998 B1
(45) Date of Patent: Jul. 22, 2003

(54) METHOD AND SYSTEM FOR IDENTIFYING THE SOURCE OF A SIGNAL

(75) Inventor: George G. Siedel, Pittsburgh, PA (US)

(73) Assignee: Westinghouse Electric Company LLC, Pittsburgh, PA (US)

(*) Notice: Subject to any disclaimer, the term of this patent is extended or adjusted under 35 U.S.C. 154(b) by 248 days.

(21) Appl. No.: 09/629,286

(22) Filed: Jul. 31, 2000

(51) Int. Cl.$^7$ .................. H01L 27/00; H01L 31/00; G01T 1/24; G01T 3/00; G21C 17/00

(52) U.S. Cl. .................. 250/370.1; 250/370.03; 250/370.05; 250/390.01; 250/390.03; 250/390.12; 250/376; 250/257; 250/258; 250/259; 250/254; 250/428

(58) Field of Search .................. 250/303, 260, 250/493.1, 390.1, 370.1, 370.5, 390.11, 370.061, 370.13; 257/429; 376/153, 155

(56) References Cited

U.S. PATENT DOCUMENTS

| | | | | |
|---|---|---|---|---|
| 3,582,656 A | * | 6/1971 | Koehler et al. | 250/83.3 |
| 3,890,959 A | * | 6/1975 | Youdin et al. | 128/2.05 F |
| 3,978,337 A | * | 8/1976 | Nickles et al. | 250/367 |
| 4,055,765 A | * | 10/1977 | Gerber et al. | 250/370 |
| 4,058,721 A | * | 11/1977 | Reiss et al. | 250/213 VT |
| 4,476,384 A | * | 10/1984 | Westphal | 250/252.1 |
| 4,485,307 A | * | 11/1984 | Osborne et al. | 250/385 |
| 4,804,514 A | * | 2/1989 | Bartko et al. | 376/154 |
| 4,857,259 A | * | 8/1989 | Bartko et al. | 376/154 |
| 4,870,282 A | * | 9/1989 | Lacy | 250/385.1 |
| 4,922,116 A | * | 5/1990 | Grinberg et al. | 250/495.1 |
| 4,999,501 A | * | 3/1991 | Lacy | 250/385.1 |
| 5,151,599 A | * | 9/1992 | Monnet et al. | 250/363.03 |
| 5,210,423 A | * | 5/1993 | Arseneau | 250/369 |
| 5,322,126 A | * | 6/1994 | Scott, III | 166/308 |

(List continued on next page.)

OTHER PUBLICATIONS

Paivi Piironen, "Data System", available at http://lidar.ssec.wisc.edu/papers/pp_thes/node14.htm, dated Dec. 13, 1996.*

Csu Hayward, "Relationship Between the Poisson and Exponential Distributions", available at http://www.sci.csuhayward.edu/statistics/Resources/Essays/PoisExp.htm, dated Feb. 13, 1999.*

Josef Honerkamp, Stochastic Dynamical Systems, VCH Publishers, Inc., 1994, pp. 170 and 491.*

Korn, G.A., "Random-Process Simulation and Measurements", McGraw-Hill Book Company, 1966.*

West Keyword Search results, performed at USPTO, dated Dec. 10, 2002.*

*Primary Examiner*—John R. Lee
*Assistant Examiner*—Bernard Souw

(57) ABSTRACT

A method for determining which of a plurality of detectors transmitted a signal, such as a signal related to neutron or gamma emissions, includes connecting each of the detectors to a single cable, such as an environmentally rugged cable. Signals are transmitted from each of the detectors over the single cable. The two ends of the cable are connected to two receivers. A different unique delay is introduced between receipt by the two receivers of a signal over the cable for each of the detectors. The receivers, which have a preamplifier, an amplifier and a discriminator, receive the signals from the two ends of the cable. A timing analyzer, such as a time-to-amplitude converter, measures a delay between one signal from one end and the other signal from the other end of the cable. A processor employs the amplitude of the signal output by the timing analyzer. Since each detector produces a unique timing difference between the inputs of the two preamplifiers, the timing analyzer produces an output signal which is proportional in amplitude with the time difference. The processor then groups and counts these various sized pulses.

28 Claims, 6 Drawing Sheets

U.S. PATENT DOCUMENTS

| | | | | |
|---|---|---|---|---|
| 5,410,156 A | * | 4/1995 | Miller | 250/390.04 |
| 5,413,179 A | * | 5/1995 | Scott, III | 166/308 |
| 5,587,585 A | * | 12/1996 | Eisen et al. | 250/370.09 |
| 5,726,453 A | | 3/1998 | Lott et al. | |
| 5,841,140 A | * | 11/1998 | Mc Croskey et al. | 250/363.03 |
| RE36,201 E | * | 4/1999 | Miller | 250/390.04 |
| 5,940,460 A | | 8/1999 | Seidel et al. | |
| 5,969,359 A | | 10/1999 | Ruddy et al. | |
| 6,069,362 A | * | 5/2000 | Giakos | 250/394 |
| 6,072,177 A | * | 6/2000 | McCroskey et al. | 250/252.1 |
| 6,160,259 A | * | 12/2000 | Petrillo et al. | 250/363.07 |
| 6,252,923 B1 | * | 6/2001 | Iacovino et al. | 376/272 |
| 6,255,655 B1 | * | 7/2001 | Mc Croskey et al. | 250/363.03 |
| 6,255,657 B1 | * | 7/2001 | Cole et al. | 250/367 |
| 6,291,825 B1 | * | 9/2001 | Scharf et al. | 250/369 |
| 6,310,349 B1 | * | 10/2001 | Wong et al. | 250/363.09 |
| 6,316,773 B1 | * | 11/2001 | Giakos | 250/394 |

\* cited by examiner

METHOD AND SYSTEM FOR IDENTIFYING THE SOURCE OF A SIGNAL

CROSS-REFERENCE TO RELATED APPLICATION

This application is related to U.S. patent application Ser. No. 08/851,237, filed May 5, 1997, now U.S. Pat. No. 5,969,359.

BACKGROUND OF THE INVENTION

1. Field of the Invention

The present invention relates to the identification of a source of a signal such as, for example, one of a plurality of detectors for neutron and gamma emissions. The invention also relates to a method and system for monitoring neutron and gamma emissions from sources such as, for example, spent nuclear fuel.

2. Background Information

Many nuclear applications require the use of "radiation hard" signal cable. Unfortunately, this type of cable tends to be bulky and expensive. Many of these nuclear applications also require the measurement of a "profile" of the radiation field. However, the drawbacks of radiation hard cable could limit some systems to use fewer sensors than desired to achieve these profiles. In some applications, this could necessitate the movement of large bulky detector systems, introducing undue hazard in the measurement process.

Measuring the gamma and neutron fields coming from a reactor core or from spent nuclear fuel assemblies (e.g., close packed, square arrays of some 200 or more evenly spaced fuel rods, typically twelve feet in height) are just two examples where space and access are at a premium. Furthermore, in each of these applications, there are compelling technical reasons for requiring a spatial profile of the field—along the height of the reactor core or along the height of the spent fuel assembly.

Application Ser. No. 08/851,237 discloses the use of miniature, temperature-resistant and radiation-resistant semiconductor detectors which permit simultaneous monitoring of the gamma and neutron emission rates from spent nuclear fuel. Arrays of semiconductor detectors may be used to obtain information from key axial locations to define the axial burnup profile for spent nuclear fuel assemblies. Use of the improved spent fuel monitoring apparatus results in significant reductions in cost and time for the measurements, as well as improved accuracy, safety and reduced radiation doses to personnel involved in spent nuclear fuel measurements. Nuclear detectors based on SiC semiconductors are capable of measuring gamma rays and neutrons simultaneously in a single, energy-resolved spectrum. Arrays of semiconductor detectors simultaneously measure neutron emission rates at key axial locations in order to define the shape of the fuel burnup profile. A string of miniature semiconductor neutron detectors simultaneously records data on a plurality of corresponding cables. The signals from those cables are multiplexed to provide independent data for each axial location, and may provide information on the entire axial burnup profile. The semiconductor detector arrays perform measurements within channels or on opposite flats of spent fuel assemblies.

Applications where neutron and/or gamma profile mapping are needed require an array of radiation sensors. In those situations, a count must be acquired from each detector location. Special radiation hard signal cables are often required, because of the high temperature and radiation environments which are present in those applications. These cables are quite costly. Hence, running a cable from each detector location becomes economically unattractive when more than a few locations are to be monitored. Furthermore, the resulting system is bulky and difficult to maneuver. The use of conventional multiplexing electronics is also impractical, since components made from silicon, like transistors, cannot withstand the environment.

Accordingly, there is room for improvement.

SUMMARY OF THE INVENTION

The present invention has been developed in view of the foregoing and other deficiencies of the prior art. This invention identifies the source of a signal from multiple detector sources. The method and system employ the time differential of two arriving signals to distinguish them from signals from other detectors, also connected to the same communication channel or cable. This reduces the number of cables required and is particularly important in applications where expensive, environmentally rugged cabling is required (e.g., spent fuel monitoring). This method permits the use of multiple detectors with a single cable, improves the quality of the data, significantly reduces the risk associated with certain measurements, and greatly reduces cost.

As one aspect of the invention, a method of determining which of a plurality of detectors transmitted a signal comprises connecting each of the detectors to a communication channel to transmit signals from each of the detectors over the communication channel; connecting the communication channel to a first receiver and a second receiver; receiving a first signal from the communication channel with the first receiver; receiving a second signal from the communication channel with the second receiver; introducing a unique delay between receipt of the first signal from the communication channel and receipt of the second signal from the communication channel for each of the detectors; measuring a delay between the first and second signals; and determining which of the detectors transmitted by associating measured delays with the unique delay.

Preferably, a cable having a first end and a second end is employed as the communication channel. The first signal is received from the first end, and the second signal is received from the second end of the cable. A plurality of first lengths are provided between the first end and the detectors, and a plurality of second different lengths are provided between the second end and the detectors, in order to provide a unique predetermined difference in length between the first and second lengths for each of the detectors.

As another aspect of the invention, a system for identifying a source of a signal comprises a communication channel; a plurality of detector means, each of which source a signal to the communication channel; means for receiving a first signal and a second signal from the communication channel, which includes means for introducing a unique delay between receipt of a first signal from the communication channel and receipt of a second signal from the communication channel for each of the detectors; means for measuring a delay between the first and second signals received from the communication channel; and means for determining from the measured delay which of the detector means sourced the signal.

As a further aspect of the invention, a system for monitoring a source of neutron or gamma emissions comprises a communication channel; a plurality of detector means for the neutron or gamma emissions, with each of the detector means for sourcing a signal related to the emissions to the communication channel; means for receiving a first signal and a second signal from the communication channel, which includes means for introducing a unique delay between receipt of a first signal from the communication channel and receipt of a second signal from the communication channel for each of the detectors; means for measuring a delay between the first and second signals received from the communication channel; and means for determining from the measured delay which of the detector means sourced the signal, in order to count the neutron or gamma emissions therefor.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
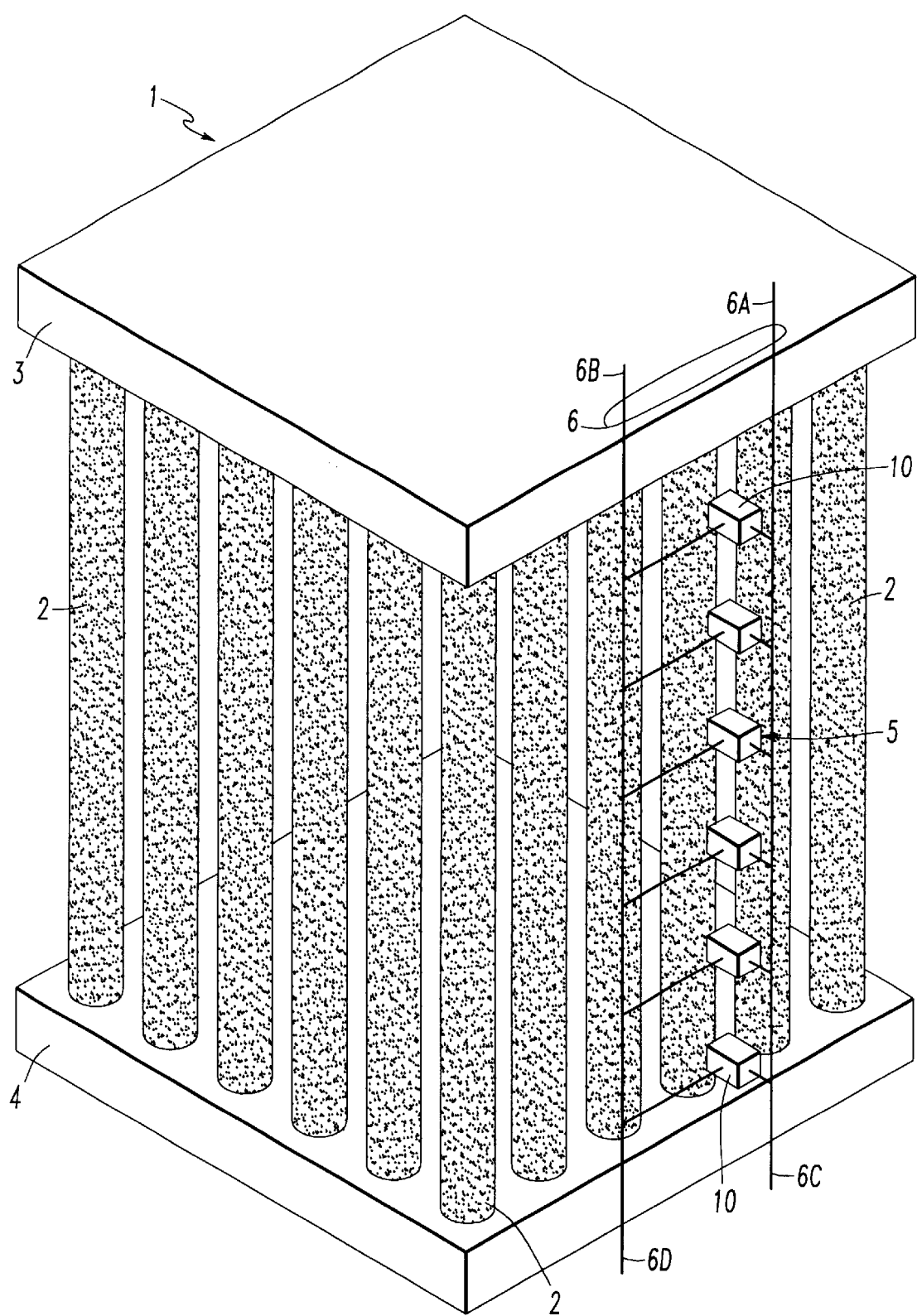
FIG. 1 is a partially schematic view of a neutron and gamma radiation detector string positioned adjacent nuclear fuel assemblies in accordance with an embodiment of the present invention.

FIG. 1 schematically illustrates the placement of an exemplary neutron and gamma semiconductor detector array adjacent to nuclear fuel. An exemplary system 1 is provided for measuring neutron and gamma emissions from nuclear fuel, although the invention is applicable to a wide range of methods or systems for identifying the source of a signal, which signal is sourced by a wide range of detectors.

As employed herein, the term "neutron emissions" means production of neutrons either by fission of reactor fuel or by spontaneous fission (e.g., $^{244}$Cm decay and ($\alpha$,n) reactions as a secondary result of $\alpha$-decay of actinide isotopes in irradiated reactor fuel).

As employed herein, the term "gamma emissions" means production of gamma rays as an accompaniment to nuclear fission or spontaneous alpha and beta decay of radioactive isotopes.

For the exemplary system 1, nuclear fuel is typically provided in the form of at least one fuel assembly 2 secured by a top plate 3 and bottom plate 4. The fuel assemblies 2 are, thus, provided in the form of a rack. In the embodiment shown in FIG. 1, an array 5 of exemplary semiconductor detectors 10 is provided in a string outside (or remote from) the rack of fuel assemblies 2 of a reactor pressure vessel. A suitable communication channel 6, such as a coaxial cable, is provided to transfer electronic signals generated by the semiconductor detectors 10. The coaxial cable 6 has two ends, each of which has a first (center) conductor 6A,6C and a second (shield) conductor 6B,6D, with 6A,6B being at one end of the cable 6 and 6C,6D being at the other end. The exemplary array 5 of semiconductor detectors 10 extends along at least the substantial axial length of the fuel assemblies 2. This arrangement permits radiation, such as neutron and gamma emissions, to be sensed at different axial locations along the fuel assemblies 2, and also permits the determination of the axial burnup profile of the fuel assemblies 2.

Figure 2:
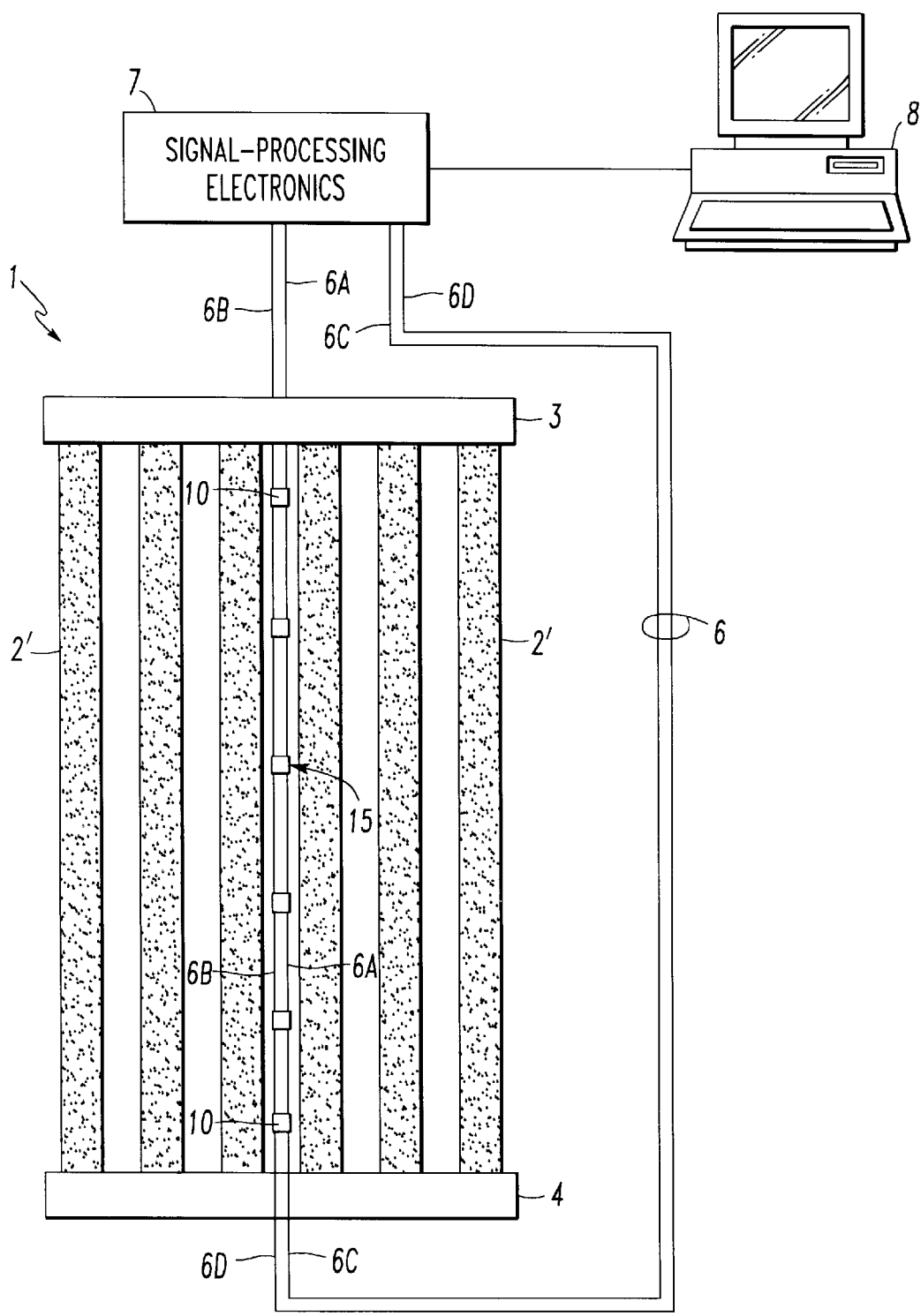
FIG. 2 is a partially schematic view of a neutron and gamma radiation detector string positioned within a rack of spent nuclear fuel assemblies in accordance with another embodiment of the present invention.

FIG. 2 schematically illustrates an exemplary semiconductor neutron and gamma detector array 15 positioned within a rack of spent fuel assemblies 2' in accordance with another embodiment of the present invention. This embodiment is similar to that shown in FIG. 1, except that the detector array 15 is located in the middle of the rack.

The detector arrays 5 and 15 of FIGS. 1 and 2, respectively, are connected by the exemplary coaxial cable 6 to signal-processing electronics 7 as shown in FIG. 2. The exemplary signal-processing electronics 7 processes voltage pulses produced by interaction of gamma rays and neutron-induced charged particles and electronically counts the pulses, although the invention is applicable to a wide range of detected signals. For example, the invention is applicable to any device that produces an electrical pulse (e.g., without limitation, vibration sensors, light sensing diodes). A suitable microprocessor 8 may be employed to store data and/or to generate a video display or a printout of the neutron and gamma ray measurements.

While six individual detectors 10 are shown in FIGS. 1 and 2, any suitable number may be employed in the arrays 5,15 along the axial length of the fuel assemblies 2,2'. Preferably, the detector arrays 5,15 include from 2 to about 100 individual semiconductor detectors, more preferably from about 4 to about 50 detectors. The spacing of the semiconductor detectors 10 may be varied depending on the radiation gradient of the fuel assemblies 2,2'. The spacing is chosen to give adequate information on the details of the shape of the axial gradient for a particular fuel type. For example, closer spacing would be used in arrays designed for boiling water reactor (BWR) fuel applications as opposed to pressurized water reactor (PWR) fuel where less severe gradients are encountered.

A typical design for a semiconductor burnup meter comprises a string of miniature SiC neutron/gamma detectors located at key axial locations along the fuel assemblies 2,2' over a length of up to about 150 inches, although the invention is applicable to a wide range of lengths and detector counts. These individual semiconductor detectors preferably simultaneously record neutron and gamma ray count rates.

The signal-processing electronics 7 of FIG. 2 sends the count rates to the microprocessor 8 (e.g., a measurement control computer, workstation, laptop PC, other suitable processor). The exemplary microprocessor 8 preferably contains software to process the individual neutron and gammaray count rates, to determine the shape of the burnup profile, and, by analysis of the profile shape, to accurately determine the total burnup of the fuel assemblies 2,2'. The axial burnup profile data may also be used to accurately determine the maximum burnup location on the fuel assemblies 2,2' if desired for spent fuel cask loading operations.

Each exemplary semiconductor detector 10 may preferably comprise a neutron converter layer and a semiconductor active region which is designed to avoid radiation damage to the semiconductor material. Also, the type of neutron converter layer, the type of semiconductor material, and the thickness and placement of the semiconductor active region are preferably controlled to allow the charged particles to pass through the active semiconductor region without substantial displacement damage. The semiconductor active region is sufficiently thin to avoid displacement damage, but is thick enough to allow sufficient ionization or electron excitation to create a measurable electronic pulse.

Figure 3:
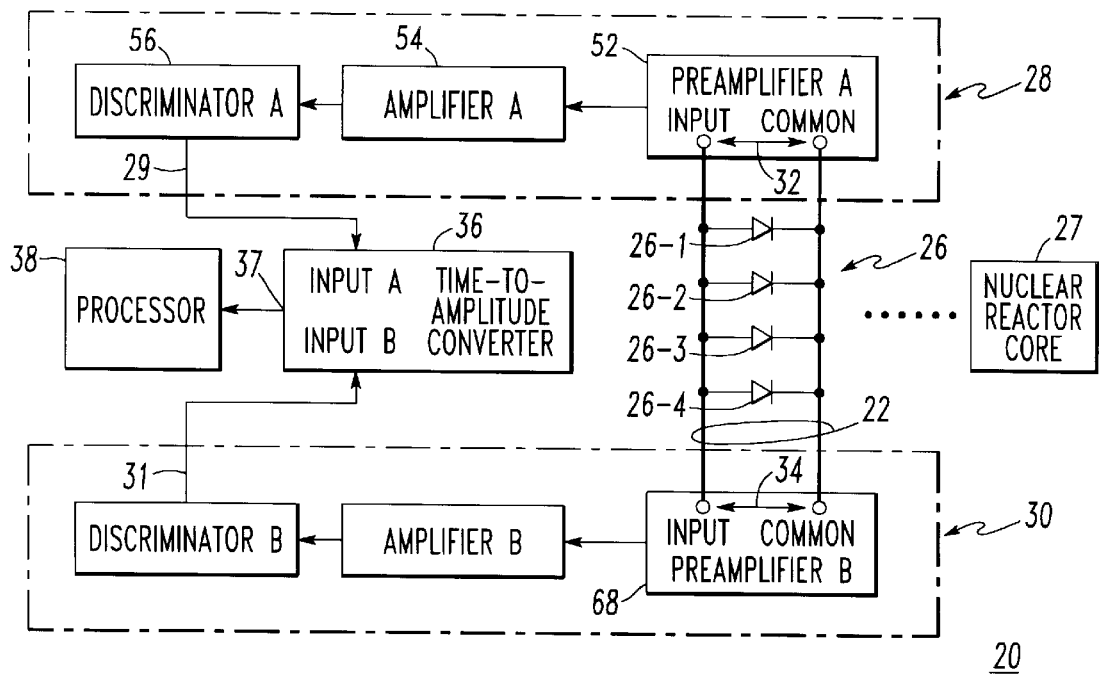
FIG. 3 is a block diagram of a detector identification system in accordance with another embodiment of the present invention.

FIG. 3 shows a detector identification system 20 for identifying a source of a signal. The system 20 includes a suitable two-ended communication channel 22, and a plurality of detectors 26 for the exemplary nuclear reactor core 27. Each of the detectors 26 sources a signal to the communication channel 22. In the preferred embodiment, the detectors 26 are identical to the detectors 10 of FIGS. 1 and 2, although a wide range of detectors may be employed. A pair of receivers 28,30 receives and outputs, at 29,31, signals 32,34, respectively, from the communication channel 22. The communication channel 22 provides a unique predetermined differential delay for each of the detectors 26, with the signal 34 of a detector (e.g., 26-1) at the receiver 30 being delayed with respect to the signal 32 of such detector at the receiver 28 by the unique predetermined differential delay (e.g., $\Delta 1$) for such detector. Similarly, other unique predetermined differential delays (e.g., $\Delta 2, \Delta 3, \Delta 4$) are employed for the detectors 26-2,26-3,26-4.

A suitable timing analyzer 36 (e.g., without limitation, Canberra Time-to-Amplitude Converter/SCA, model 2145; Ortec Picosecond Time Analyzer, model 9308) measures the delay between the output signals 29,31 which are received by the respective receivers 28,30 from the communication channel 22. For example, a time-to-amplitude converter measures the time between two events and outputs, at 37, a signal having a relative amplitude which is proportional to this time difference.

If both neutron and gamma profiles are measured, then the signal is split at the output of the amplifier A 54 and amplifier B. Duplicate circuits are then employed following the amplifiers. One circuit has its discriminators set for gamma signals, while the other duplicate circuit is adjusted to detect neutrons. Each duplicate circuit, in turn, employs a time-to-amplitude converter and processor.

A suitable processor 38 (e.g., computer and software) groups and counts the various amplitude signals. Hence, this identifies, for example, detector 26-1 as being the source of the signal if the measured delay is equal to, or closest to, the predetermined delay $\Delta 1$, while detector 26-2 is the source of the signal if the measured delay is equal to, or closest to, the predetermined delay $\Delta 2$. The suitable processor 38 (or another processor (not shown)) may be employed for classifying, counting and storing the electronic signals (e.g., related to emissions) 32,34 from the detectors 26, and employing those signals for simultaneously mapping neutron and/or gamma profiles.

As shown in FIG. 3, the first receiver 28 receives the signal 32 from one end of the communication channel 22, and the second receiver 30 receives the signal 34 from the other end of the communication channel 22. The exemplary system 20 employs timing analysis of the signals 32,34 arriving at the respective receivers 28,30. Although an exemplary system configuration is shown in FIG. 3, the specific configuration, and length or time differences between the detectors 26 and the receivers 28,30 may be modified to reflect the actual count of detectors 26 and/or the expected rate of exemplary neutron and gamma emissions for each of those detectors 26.

Continuing to refer to FIG. 3, each of the exemplary receivers 28,30 includes (as shown with receiver 28) a preamplifier 52, an amplifier 54 and a discriminator 56. The preamplifier 52 and amplifier 54 provide suitable amplification of the signal 32 from the communication channel 22. The function of the discriminator 56 is to accept incoming signals that are above a preset voltage or fall within a set voltage range. In addition, the discriminator 56 provides an output pulse for each accepted input signal. This output pulse has the same shape and amplitude regardless of the input signal. The timing analyzer 36 produces the output signal 37 having an amplitude which is dependent on the time difference in the arrival of the signals 32,34 at the two preamplifiers 52. Since the amplitude from the timing analyzer 36 depends on the detector 26 from which the signal originated, the processor 38 sorts the various amplitude signals and adds a count for the appropriate detector.

For example, most time analyzers are flexible in regard to the time span. For instance, the exemplary Ortec 9308 time analyzer can operate over 12 ranges which span from 80 ns to 163 $\mu$s by dividing the time period into 65536 bins. So, for an 80 ns span, each time increment is 1.2 ps. For a 163 $\mu$s span, each increment is 2.5 ns. As a further example, the exemplary Canberra 2145 time-to-amplitude converter/SCA has 15 range settings from 20 ns to 1 ms. The shortest time increment that can be measured is 5 ns to 100 ns on the longest time range. In these examples, there is considerable flexibility in both the time range and the resolution of the time increments.

An exemplary 1 ns time difference may readily be resolved if the output signal 29 of the discriminator 56 is suitably narrow and has a sufficiently sharp rise time. Although an incremental time difference of 1 ns is disclosed, the invention is applicable to a wide range of incremental time differences and detector counts.

In order for the exemplary system 20 to be effective, the period between the two timed events for the signals 32,34 should not see another signal. This means that as the count rate increases, so does the possibility of errors due to other events occurring during this period. To keep this type of error sufficiently small, the maximum timed period should preferably be set to be relatively short with respect to the average period of the events. For example, if the longest time between the timed events is 10 ns, and if the average period of the incoming signals is desired to be 100 times longer, then the highest count rate would have a period of 1 $\mu$s (=100×10 ns)(i.e., a count rate of 1 Mcps). The exemplary Ortec 9308 time analyzer operates at an average rate of 2 Mcps.

Figure 4:
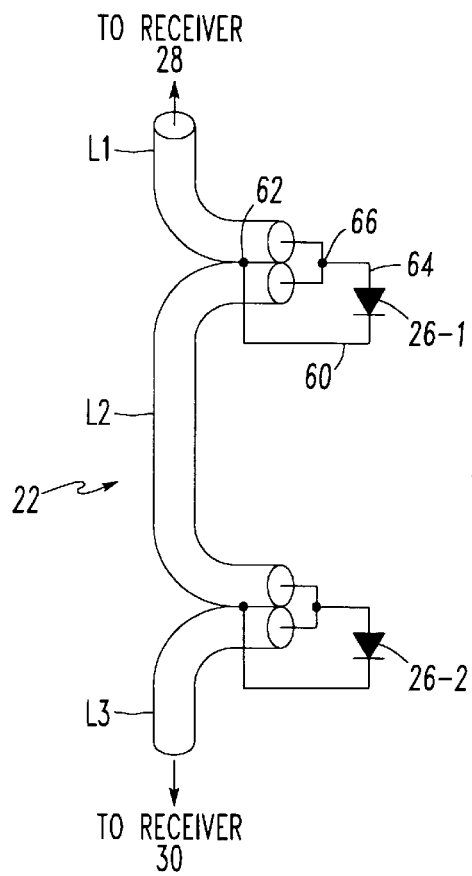
FIG. 4 is a block diagram of the communication cable for a detector identification system of FIG. 3.

An example of the communication channel 22 is shown in FIG. 4. For the first three detectors 26-1,26-2,26-3 (only two detectors are shown in FIG. 4), the communication channel 22 has a length (e.g., L1) between the first receiver 28 and the first detector 26-1, a length (e.g., L2) between the first detector 26-1 and the second detector 26-2, and a length (e.g., L3) between the second detector 26-2 and the third detector 26-3 of FIG. 3. In this example, the communication channel 22 is formed from an environmentally rugged cable (e.g., without limitation, coaxial quartz insulated cable marketed by Image & Sensing Corp.; Habiatron Cable marketed by Habia Cable Co.). Preferably, equal length intervals L1,L2,L3 are employed in order to simplify the determination of the time differences, although the invention is applicable to delays provided by different cable lengths or by other suitable delay sources, such as, for example, delay lines.

In the examples shown in FIGS. 3 and 4, the exemplary detectors 26 produce a voltage which is transferred to the exemplary "radiation hard" coaxial cable 22. In these examples, the common lead 60 is connected to the shield 62 while the signal wire 64 is connected to the center conductor 66 of the coaxial cable 22.

As shown in FIG. 3, if the detector 26-1 (shown as an exemplary diode) develops a voltage across it, then this voltage will be detected at preamplifier (A) 52 sooner than at preamplifier (B) 68. This is due to the exemplary longer distance which is between detector 26-1 and preamplifier (B) 68 than is between detector 26-1 and preamplifier (A) 52. The opposite is true for detector 26-4, which is closer to the preamplifier (B) 68 than to the preamplifier (A) 52. The differential distance from each detector 26 to each preamplifier 52,68 is unique, therefore, the time differential between the arrival of the signals 32,34 at the respective preamplifiers 52,68 is unique for each detector 26.

For example, SiC sensors can detect both gamma and neutron events. The sensor output signal, however, is higher in amplitude for the neutron events. The discriminator 56 can be set to accept the appropriate range of amplitudes. Therefore, the discriminator setting determines whether gamma rays, neutrons, or both are being counted. The total counts per second that the timing analyzer 36 handles depends on the speed of the analyzer itself, the number of detectors 26, and the incremental time separation of the signals 32,34.

Figure 5:
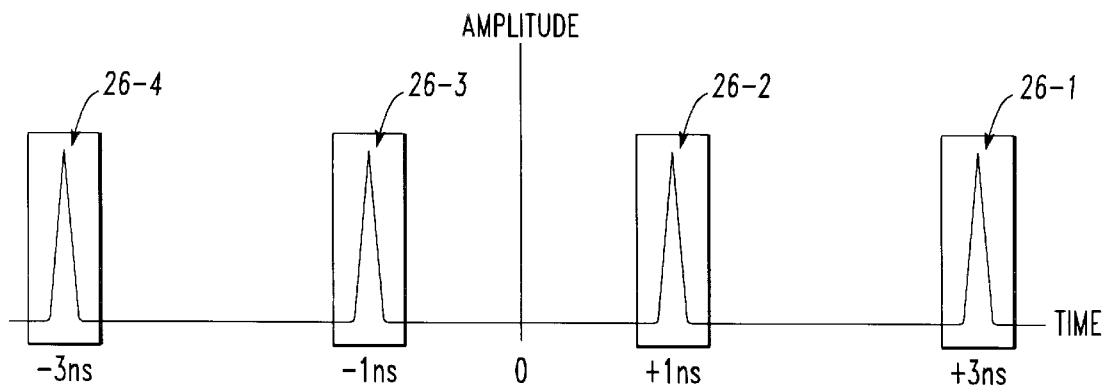
FIG. 5 is a plot showing the time differences between arriving pulses for the detectors of FIG. 3.

FIG. 5 shows the time differences between arriving pulses at the receivers 28,30 from the various detectors 26. The exemplary graph indicates differential times from FIG. 3 when each line segment is, for example, about 1 foot long (i.e., L1=L2=L3=1 foot of FIG. 4)(ignoring, for convenience of illustration, the difference between the propagation velocity of light in a vacuum and the somewhat slower propagation velocity of the pulses in a coaxial cable).

For instance, if the signal originated from detector 26-1, then the signal would travel one foot to preamplifier (A) 52 and four feet to preamplifier (B) 68. This would produce a difference of +3 ns (A–B) in the arrival times. A time window set at +3 ns would register the signal as a count from detector 26-1 since it is the only detector that could produce that time difference. Detector 26-4 would also produce a 3 ns separation, but the difference would be −3 ns since the signal would reach preamplifier (B) 68 before preamplifier (A) 52. Hence, the exemplary timing data shown in FIG. 5 provides a method of collecting and segregating the signals according to the detector which produced them, while employing a single common cable 22.

It will be appreciated that a wide variation of the cable lengths and time delays may be employed between the various adjacent detectors 26 and between the receivers 28,30 and those individual detectors 26. Any suitable approach which provides a unique predetermined delay between the signals 32,34 for each of the detectors 26 may be employed.

Figure 6:
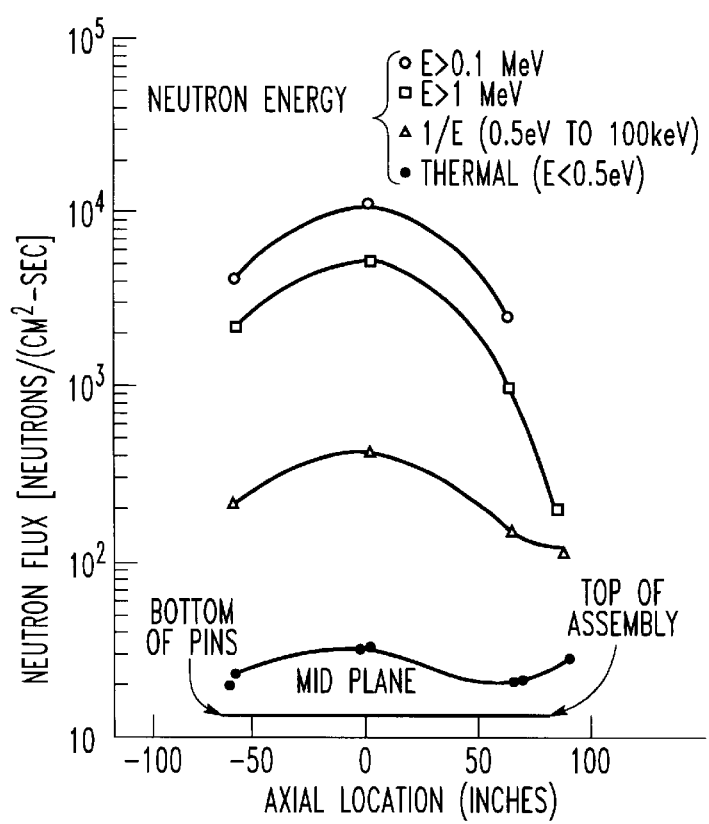
FIG. 6 is a graph showing axial neutron count rate distribution measured along the face of a spent nuclear fuel assembly.

FIG. 6 shows reported Solid State Track Recorder (SSTR) measurements of the neutron emission rate for spent fuel assemblies. These data were taken for a spent fuel assembly from a Pressurized Water Reactor (PWR) that had an average burnup of 25,665 Mwd/MTU and had been discharged approximately 2.7 years prior to the SSTR neutron measurements. It can be seen from the data presented in FIG. 6 that the fast neutron ($E_n$>1 MeV) emission rate has an axial profile which is closely related to the burnup profile for the spent fuel assembly.

Figure 7:
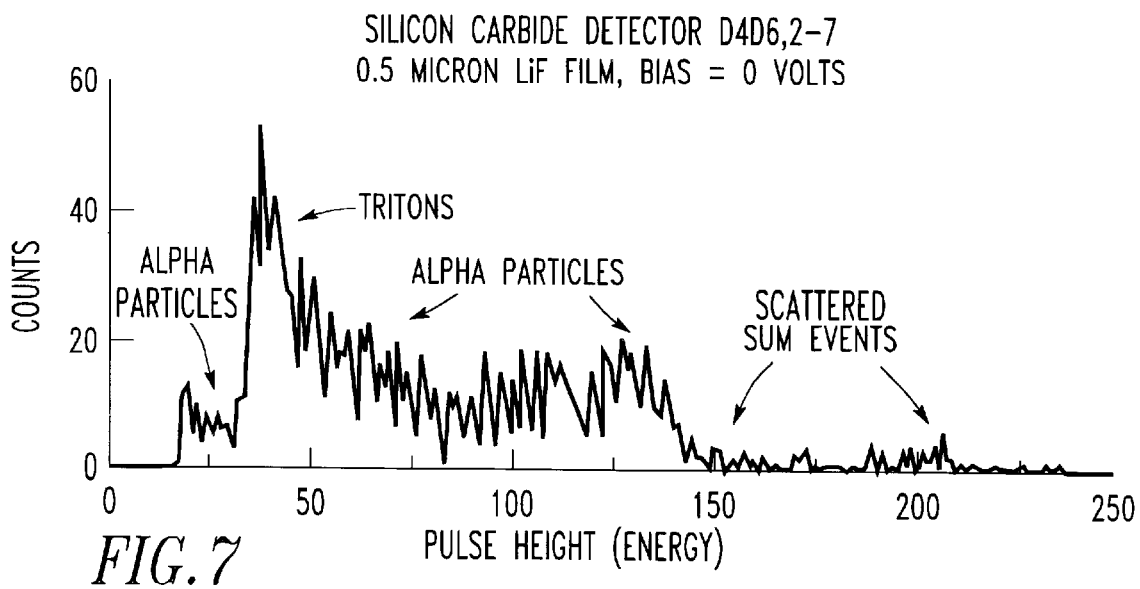
FIG. 7 is a graph showing the response of a semiconductor detector irradiated with neutrons.
Figure 8:
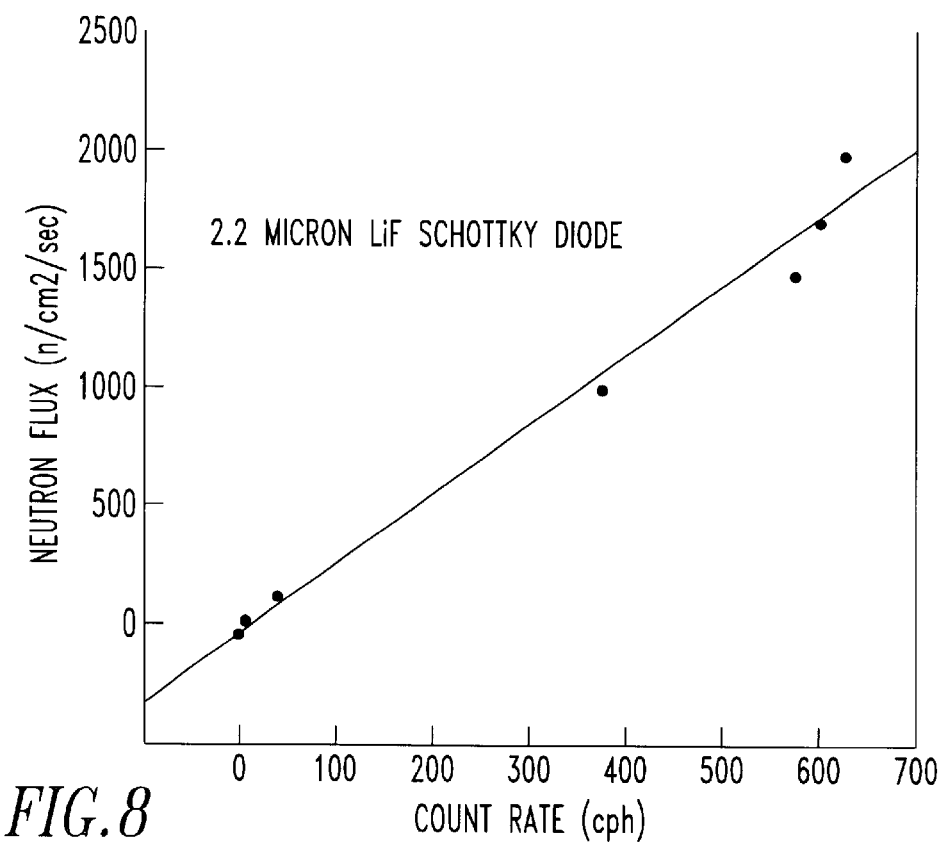
FIG. 8 is a graph showing thermal neutron flux as a function of neutron count rate for a semiconductor detector.

An example of a neutron-induced charged particle spectrum obtained with an exemplary SiC detector is shown in FIG. 7. In this case, a 400 m diameter SiC Schottky diode equipped with a 0.5-m thick $^6$LiF neutron converter layer was exposed to thermalized neutrons from a $^{252}$Cf isotopic source. The charged particle spectrum is produced by the energetic reaction products from the $^6$Li(n,α)$^3$H reaction. The portions of the spectrum that correspond to the alpha particle ($^4$He) and triton ($^3$H) are identified in FIG. 7. Neutron detection using $Zr^{10}B_2$ and $^{235}$U converter layers was also demonstrated. In the case of $^6$LiF, a linear relationship of gamma count rate to thermal neutron flux was demonstrated over three orders of magnitude in neutron flux, and these data are shown in FIG. 8.

Figure 9:
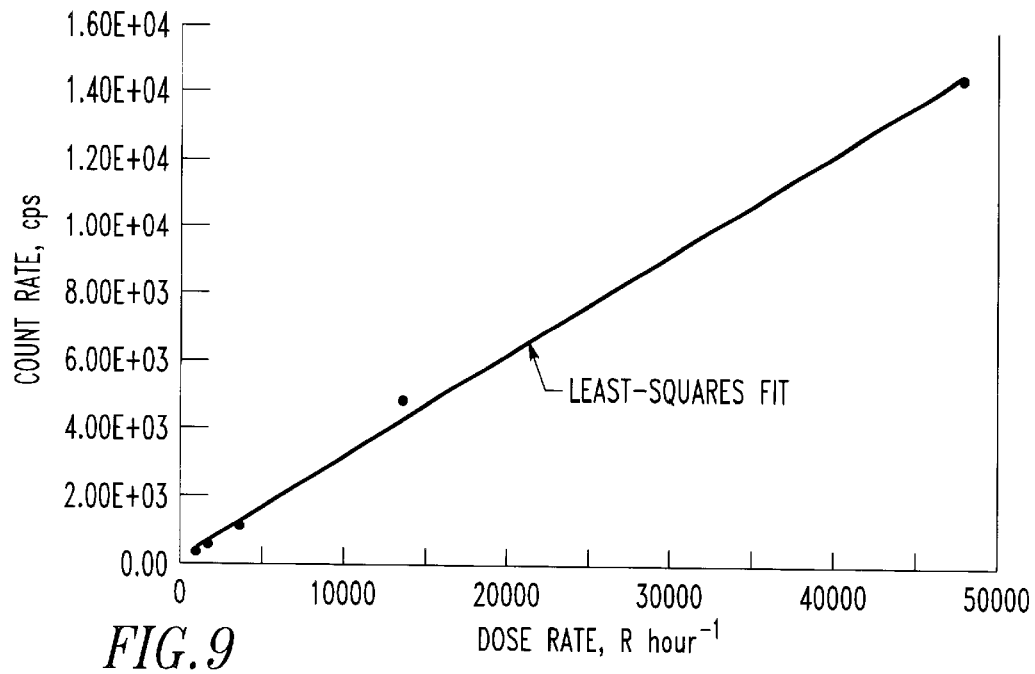
FIG. 9 is a graph showing gamma count rate as a function of gamma ray dose rate for a semiconductor detector.

FIG. 9 shows gamma count rate as a function of gamma ray dose rate for a semiconductor detector. The SiC detectors are employed in intense gamma ray fields using a gamma hot cell. For example, $^{60}$Co sources produce local gamma ray fields with dose rates up to 50,000 R/hr. Preferably, a linear relationship between gamma-induced SiC count rate and gamma dose rate is provided.

A major advantage of the SiC neutron and gamma ray response is that the neutron- and gamma-induced pulses are completely separable on the basis of pulse height. The SiC sensors can detect both gamma rays and neutron events, with a converter layer being connected to the SiC to detect neutrons. The neutron events produce pulses larger than those being from gamma rays. The discriminator 56 may be used to select either the gamma or neutron events. This is done by adjusting the discriminator setting to accept the desired voltage pulses. The neutron-induced charged particle pulse height spectrum shown in FIG. 7 is typical for the $^6$Li case. The gamma ray induced signal is generally confined to much lower pulse heights than the neutron-induced charged particle spectrum.

Figure 10:
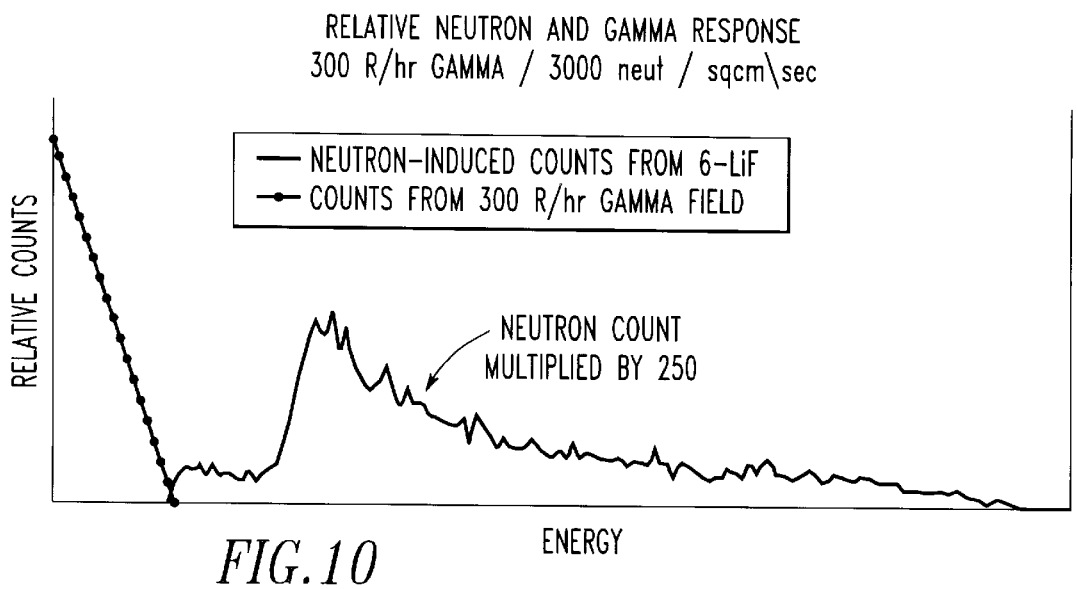
FIG. 10 is a graph showing a comparison of neutron-induced and gamma ray-induced signals in a semiconductor detector, with the magnitudes of the neutron and gamma ray fields being similar to those expected in the vicinity of a spent fuel assembly.

A combined gamma ray and neutron-induced pulse height spectrum is shown in FIG. 10. In this case, the response from a 300 R/hr gamma ray field is shown together with the response from a 3000 neutron/cm$^2$/second thermal neutron flux. FIG. 10 illustrates that gamma ray count rate (e.g., $^{137}$Cs) and neutron (e.g., $^{244}$Cm and $^{242}$Cm spontaneous fission) count rates can be determined simultaneously with a single SiC detector. The conventional Los Alamos Fork Detector, for example, requires a cadmium-covered $^{235}$U fission chamber to detect neutrons and a gamma ionization chamber to detect gross-gammas. Both of these large detectors could be replaced with a simpler, more compact, SiC detector which is less sensitive to temperature and other environmental conditions in the measurement location. In addition, the SiC detector can provide neutron flux gradient data which can define the assembly burnup profile, and, thereby, improve the accuracy of burnup validation measurements.

The present invention reduces cable count and costs by employing one communication channel to identify the source of a signal. The invention is especially advantageous in applications which provide neutron and/or gamma profile mapping and, thus, which employ an array of radiation detectors or sensors in order to provide a count from each detector. Furthermore, as special radiation hard signal cables are often required for high temperature and/or radiation environments, substantial savings in cable costs is readily achieved by employing a single communication cable.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of determining which of a plurality of discrete detectors transmitted a signal, said method comprising the steps of:

connecting each of said discrete detectors to a communication channel to transmit signals from each of said discrete detectors over said communication channel;

connecting said communication channel to a first receiver and a second receiver;

receiving a first signal from said communication channel with the first receiver;

receiving a second signal from said communication channel with the second receiver;

introducing a unique delay between receipt of said first signal from said communication channel and receipt of said second signal from said communication channel for each of said discrete detectors;

measuring a delay between said first and second signals; and determining which of said discrete detectors transmitted by associating measured delays with said unique delay.

2. The method of claim 1, further comprising the steps of:
employing as said communication channel a cable having a first end and a second end;
receiving said first signal from said first end;
receiving said second signal from said second end; and
providing a plurality of first lengths between said first end and said discrete detectors, and a plurality of second different lengths between said second end and said discrete detectors, in order to provide a unique predetermined difference in length between said first and second lengths for each of said discrete detectors.

3. The method of claim 2, further comprising the steps of:
employing as said discrete detectors at least a first detector, a second detector and a third detector; and
employing a third length between said first end and said first detector, a fourth length between said first detector and said second detector, a fifth length between said second detector and said third detector, and a sixth length between said third detector and said second end.

4. The method of claim 3, further comprising the steps of:
employing equal third and sixth lengths.

5. The method of claim 3, further comprising the steps of:
employing equal fourth and fifth lengths.

6. The method of claim 2, further comprising the steps of:
employing a first delay between one of said discrete detectors and said first end;
employing a second delay between said one of said discrete detectors and said second end, said first and second delays providing as said unique delay a first unique delay;

employing a third delay between another one of said discrete detectors and said first end;

employing a fourth delay between said another one of said discrete detectors and said second end, said third and fourth delays providing a second unique delay which is different than said first unique delay;

receiving a third signal from said another one of said discrete detectors from said communication channel;

receiving a fourth signal from said another one of said discrete detectors from said communication channel;

measuring a delay between said third and fourth signals; and determining that said another one of said discrete detectors transmitted by associating said delay between said third and fourth signals with said second unique delay.

7. The method of claim 6, further comprising the step of:
classifying and counting events from said discrete detectors.

8. A system for identifying a source of a signal, said system comprising:

a communication channel;

a plurality of discrete detector means, each of said discrete detector means for sourcing a signal to said communication channel;

means for receiving a first signal and a second signal from said communication channel;

said communication channel including means for introducing a unique delay between receipt of a first signal from said communication channel and receipt of a second signal from said communication channel for each of said discrete detector means;

means for measuring a delay between said first and second signals received from said communication channel; and means for determining from said measured delay which of said discrete detector means sourced said signal.

9. The system of claim 8, wherein said discrete detector means form an array of radiation sensors.

10. The system of claim 8, wherein said means for measuring a delay includes timing analyzer means for measuring said delay between said first and second signals received form said communication channel.

11. The system of claim 8, wherein said communication channel includes environmentally rugged cables.

12. The system of claim 8, wherein said discrete detector means includes means for measuring neutron and gamma emissions.

13. The system of claim 12, wherein said discrete detector means further includes means for sourcing as said signal an electronic signal in response to said neutron and gamma emissions.

14. A system for monitoring a source of neutron or gamma emissions, said system comprising:

a communication channel;

a plurality of discrete detector means for said neutron or gamma emissions, each of said discrete detector means for sourcing a signal related to said emissions to said communication channel;

means for receiving a first signal and a second signal from said communication channel;

said communication channel including means for introducing a unique delay between receipt of a first signal from said communication channel and receipt of a second signal from said communication channel for each of said discrete detector means;

means for measuring a delay between said first and second signals received from said communication channel; and means for determining from said measured delay which of said discrete detector means sourced said signal, in order to count said neutron or gamma emissions therefor.

15. The system of claim 14, wherein said discrete detector means includes means for detecting both of said neutron emissions and said gamma emissions; and wherein said means for determining includes means for simultaneously measuring neutron emissions and gamma emissions.

16. The system of claim 14, wherein spent nuclear fuel is said source of neutron or gamma emissions.

17. The system of claim 16, wherein said plurality of discrete detector means form a detector array for said spent nuclear fuel.

18. The system of claim 14, wherein at least one nuclear fuel assembly is said source of neutron or gamma emissions.

19. The system of claim 18, wherein said at least one nuclear fuel assembly includes a plurality of nuclear fuel assemblies; wherein said nuclear fuel assemblies are disposed in a rack; and wherein said discrete detector means form a detector array which is outside said rack of said nuclear fuel assemblies.

20. The system of claim 18, wherein said at least one nuclear fuel assembly includes a plurality of nuclear fuel assemblies; wherein said nuclear fuel assemblies are disposed in a rack; and wherein said discrete detector means form a detector array which is inside said rack of said nuclear fuel assemblies.

21. The system of claim 18, wherein said at least one nuclear fuel assembly extends in an axial direction; and wherein said plurality of discrete detector means form a detector array for said at least one nuclear fuel assembly, with said detector array being disposed along a substantial axial length of said at least one fuel assembly.

22. The system of claim 21, wherein said plurality of discrete detector means include a string of discrete detectors as said detector array.

23. The system of claim 22, wherein said detector array has a length of about 150 inches.

24. The system of claim 22, wherein said string of discrete detectors includes about 2 to 100 discrete detectors as the detector array.

25. The system of claim 14, wherein a nuclear reactor core is said source of neutron or gamma emissions.

26. The system of claim 25, wherein said plurality of discrete detector means form a detector array for said nuclear reactor core.

27. The system of claim 14, wherein at least one core fuel assembly is said source of neutron or gamma emissions.

28. The system of claim 14, wherein said plurality of discrete detector means is remotely located from said nuclear reactor core.

* * * * *

UNITED STATES PATENT AND TRADEMARK OFFICE
CERTIFICATE OF CORRECTION

PATENT NO. : 6,596,998 B1  Page 1 of 1
DATED : July 22, 2003
INVENTOR(S) : John G. Seidel et al.

It is certified that error appears in the above-identified patent and that said Letters Patent is hereby corrected as shown below:

<u>Title page,</u>
Item [75], Inventor(s), should read -- John G. Seidel, Pittsburgh, PA
                                             Francis H. Ruddy, Monroeville, PA
                                             Abdul R. Dulloo, Pittsburgh, PA
                                             Thomas R. Congedo; Pittsburgh, PA --

Signed and Sealed this

Eleventh Day of November, 2003

JAMES E. ROGAN
*Director of the United States Patent and Trademark Office*